United States Patent [19]
Jindal et al.

[11] Patent Number: 6,092,178
[45] Date of Patent: Jul. 18, 2000

[54] SYSTEM FOR RESPONDING TO A RESOURCE REQUEST

[75] Inventors: Anita Jindal; Swee Boon Lim, both of Cupertino; Sanjay Radia, Fremont; Whei-Ling Chang, Saratoga, all of Calif.

[73] Assignee: Sun Microsystems, Inc., Palo Alto, Calif.

[21] Appl. No.: 09/146,771

[22] Filed: Sep. 3, 1998

[51] Int. Cl.[7] .................................................. G06F 15/16
[52] U.S. Cl. ............................................. 712/27; 709/105
[58] Field of Search .............................. 712/27; 709/102, 709/104, 105, 304

[56] References Cited

U.S. PATENT DOCUMENTS

| | | | |
|---|---|---|---|
| 5,371,852 | 12/1994 | Attanasio et al. | 395/200 |
| 5,459,837 | 10/1995 | Caccavale | 395/184.01 |
| 5,506,999 | 4/1996 | Skillman | 709/105 |
| 5,583,994 | 12/1996 | Rangan | 709/219 |
| 5,742,598 | 4/1998 | Dunn | 370/393 |
| 5,881,238 | 3/1999 | Aman | 709/226 |
| 5,894,556 | 4/1999 | Grimm | 709/227 |
| 5,915,095 | 6/1999 | Miskowiec | 709/223 |
| 5,937,165 | 8/1999 | Schwaller | 709/224 |
| 5,938,732 | 8/1999 | Lim | 709/229 |
| 6,038,599 | 3/2000 | Black | 709/223 |

FOREIGN PATENT DOCUMENTS

| | | | |
|---|---|---|---|
| WO 98/26559 | 6/1998 | WIPO | H04L 29/12 |

OTHER PUBLICATIONS

Colajanni, M., Yu, P. and Dias, D., *Analysis of task Assignment Policies in Scalable Distributed Web-Server Systems,* IEEE Transactions on Parallel and Distributed Systems, vol. 9, No. 6, Jun. 1998, pp. 585–599.

Pending U.S. application No. 09/146,848, by Anita Jindal, et al., titled "Load Balancing for Replicated Services," filed Sep. 3, 1998, with Attorney Docket No. SUN–P3316–JTF.

Pending U.S. application No. 09/146,722, by Anita Jindal, et al., titled "Load Balancing in a Network Environment," filed Sep. 3, 1998, with Attorney Docket No. SUN–P3374–JTF.

*Primary Examiner*—Eric Coleman
*Attorney, Agent, or Firm*—Daniel Vaughan; Park & Vaughan LLP

[57] ABSTRACT

A trigger is provided in association with a network naming service, such as DNS (Domain Name Service), that handles client requests for an application. The trigger comprises a set of executable instructions referenced by a resource record associated with an identifier of the application. In response to a client request concerning the application, the resource record is retrieved and the instructions are executed. In one implementation of a trigger, a DNS server provides load balancing among a plurality of servers within a network name space (e.g., domain or sub-domain) offering an application program (or replicated service) that is known by a virtual server name. A policy is selected for choosing a preferred server from the plurality of servers according to a specified status or operational characteristic of the application instances, such as the least-loaded instance of the application or the instance with the fastest response time. The policy is encapsulated within multiple levels of objects or modules distributed among the plurality of servers and the DNS server. The objects collect and assemble the servers' status and operational characteristics. The information collected by the objects is analyzed to select the server that best satisfies the selected policy. A client request for the application is received by the DNS server, which retrieves a resource record corresponding to the virtual server name. Within the record is the name of a trigger. The trigger is executed to select, or retrieve an identity of, a server to which the client request is to be directed.

27 Claims, 4 Drawing Sheets

SYSTEM FOR RESPONDING TO A RESOURCE REQUEST

The following co-pending U.S. patent applications, filed on Sep. 3, 1998, are related to the present application and are hereby incorporated by reference: application Ser. No. 09/146,772, entitled "Load Balancing in a Network Enviroiment," and application Ser. No. 09/146,848, entitled "Load Balancing for Replicated Services."

BACKGROUND

This invention relates to the fields of computer systems and networking. More particularly, a system and methods are provided for executing a set of computer-readable instructions in response to a network resource request.

The Domain Name Service (DNS) system is a network name service that is used to assist a computer system, such as a client, in locating or connecting to another network entity. For example, a DNS server receives requests from client systems that wish to connect to a server offering a desired application or service—such as electronic mail or Internet browsing—but which do not know how to reach the server (e.g., its location on the network). The client therefore queries the DNS server, which provides a suitable response depending on the type of information the client requests (e.g., a network address of the desired server).

Multiple servers may be configured to offer an application or replicated service (e.g., a service offered simultaneously on each of multiple servers), in which case the client may be directed to any of the multiple servers in order to satisfy the client's request. In addition, the multiple servers may be situated in various locations and/or serve different clients. Therefore, in order to make effective use of the application or replicated service, a method is needed to distribute clients' requests among the servers and/or among the instances of the application or service. This process is often known as load balancing.

DNS servers can be configured to provide load balancing in addition to their traditional roles (e.g., resolving requests for information concerning a network entity). Methods of using a DNS server for load balancing among instances of a replicated service have been developed, but are unsatisfactory for various reasons.

In one method of load balancing a replicated service, a DNS server directs or assigns requests to the servers offering the service on a round-robin basis. In other words, client requests are routed to the servers in a rotational order. Each instance of the replicated service may thus receive substantially the same number of requests as the other instances. Unfortunately, this scheme can be very inefficient. Because the servers that offer a replicated service may be geographically distributed, a client's request may be routed to a relatively distant server, thus increasing the transmission time and cost incurred in submitting the request and receiving a response. In addition, the processing power of the servers may vary widely. One server may, for example, be capable of handling a larger number of requests or be able to process requests faster than another server. As a result, a more powerful server may periodically be idle while a slower server is over-burdened.

In another method of load balancing, specialized hardware is employed in addition to a DNS server to store information concerning the servers offering a replicated service. In particular, this method stores information concerning the servers' burdens (e.g., number of client requests), on a computer system other than the DNS server. Based on that information a user's request is routed to the least-loaded server. In a web-browsing environment, for example, when a user's service access request (e.g., a connection request to a particular Uniform Resource Locator (URL) or virtual server name) is received by a DNS server, the DNS server queries or passes the request to the specialized hardware. Based on the stored information, the user's request is then forwarded to the least-loaded server offering the requested service. This method is also inefficient because it delays and adds a level of complexity to satisfying access requests. Requiring the DNS server to query or access another server in order to resolve the request is inefficient and delays satisfaction of the request.

In yet other methods of balancing requests among multiple instances of a replicated service, client requests are randomly assigned to one of the multiple host servers or are assigned to the closest server. Random assignment of client requests suffers the same disadvantages as a round-robin scheme, often causing requests to be routed to geographically distant servers and/or servers that are more burdened than others. This naturally results in unnecessary delay. Simply assigning requests to the closest server may also be inefficient because a faster response may be available from a server that, although further from the client, has less of a load.

As mentioned above, present load balancing techniques are also limited in scope. For example, the techniques described above are typically designed for replicated services only and, in addition, only consider the operational status or characteristics of the servers hosting the replicated service, not the service itself. In other words, present techniques do not allow load balancing among instances of application programs other than replicated services or, more generally, the collection or consideration of information concerning the status of individual instances of applications or services executing on multiple servers.

In its traditional role as a name server, a DNS server may also be configured to return certain, limited, information other than a network address of a desired server. Such information may include, for example, the name of a machine or entity responsible for a particular server or service, the name of a DNS server providing name services for a particular portion (e.g., domain) of a network, a network address corresponding to an alias for a domain name, etc.

The information that is returned by a DNS server is inflexible, however, in that it is hard-coded into resource records that are automatically returned in response to a client's request. Each record can only return the type of information for which it is configured; therefore, the type of information that is returned depends entirely upon what is requested. The content of a resource record may be modified, but doing so entails a large amount of effort for most networks and cannot be done quickly. For example, making modifications to resource records may require updating the DNS database on a primary server as well as propagating the update(s) to secondary DNS servers.

A type of resource record that, when invoked, allows some action to be taken (other than simply returning a piece of information to the client) is unknown. Such a resource record would greatly enhance the functionality and flexibility of a network name service such as DNS.

SUMMARY

In one embodiment of the invention a trigger is provided for taking action in response to a client request received at a DNS server. In this embodiment, client requests for an application (e.g., an application program or replicated service) are load-balanced among the multiple instances of the application operating on multiple servers.

A trigger comprises a series of executable instructions stored and executed on the DNS server or other system coupled to the DNS server. To identify the trigger, a new type of DNS resource record is provided for inclusion in a DNS database. The new resource record maps an identity of the requested application (e.g., virtual server name, alias) to a trigger that is executed in response to a client request concerning the application.

In order to enhance load balancing of the application, various information is collected from the application instances and, possibly, the servers hosting those instances. The collected information concerns the status (e.g., operational or not operational) and/or operational characteristics (e.g., number of client requests, response time, throughput) of the instances and/or servers.

Based on the collected information, one or more preferred servers are identified based on one or more load balancing policies. A preferred server is a server that is to receive client requests until a different server is determined to be optimal under the policy or policies. Illustratively, each of the multiple servers is preferred at different times in order to distribute client requests for the application.

Exemplary policies reflect preferences for the least-loaded instance of the application or the instance having the fastest response time. Illustratively, the least-loaded instance is that which has the fewest connected clients and/or the fewest pending client requests. Another policy favors the closest instance of the application, which is the instance operating upon the server that can be reached in the fewest network hops or connections. Another illustrative policy favors the server and/or the instance with the greatest throughput (e.g., the highest number of client requests satisfied in a particular period of time).

The collected information and/or identity (e.g., network address) of a preferred server are stored, illustratively on the DNS server. A resource record tying the application to a trigger is stored in a DNS database. When a client submits a request concerning the application (e.g., by specifying a virtual server name or a domain name), the DNS server searches its database for a resource record associated with the application (e.g., the requested virtual server name or domain name). The record identifies a trigger that is retrieved and executed. When a trigger executes in response to a client request, it may retrieve an identity of a preferred server or analyze the information and make its own determination as to which server is to receive the client request. In one alternative embodiment of the invention, a trigger conducts a real-time interrogation of the application instances and/or servers in order to determine a preferred server.

A client request may include a parameter or criteria for selecting a preferred server, in which case the trigger takes the parameter into account when determining or retrieving the identity of a preferred server.

In one embodiment of the invention a load-balancing framework is employed to collect information from application instances. An illustrative framework consists of multiple executable objects, modules or other collection of executable instructions. A first type of object, called a status object, is configured to collect one or more pieces of information from an instance of the application (and/or its server) that is being load-balanced. Each instance of an application is thus associated with its own status object(s).

Each instance of the load-balanced application is also associated with an individual monitor object or IMO (e.g., another module or series of executable instructions). Each IMO invokes and stores information from one or more status object(s) collecting information concerning an instance of the application.

A replicated monitor object (RMO) or module is employed to collect information from the IMOs associated with the various instances of the load-balanced application. The RMO stores this information, which is then analyzed to identify a preferred server in accordance with the selected policy/policies.

Finally, a specialized updater object updates a data structure in accordance with the information collected by the status objects. In one embodiment of the invention the updater object analyzes the collected data and selects one or more preferred servers, identities of which are stored in the data structure. In another embodiment of the invention the collected information is stored to allow a trigger to perform its own analysis in response to a client request.

DETAILED DESCRIPTION

Figure 1:
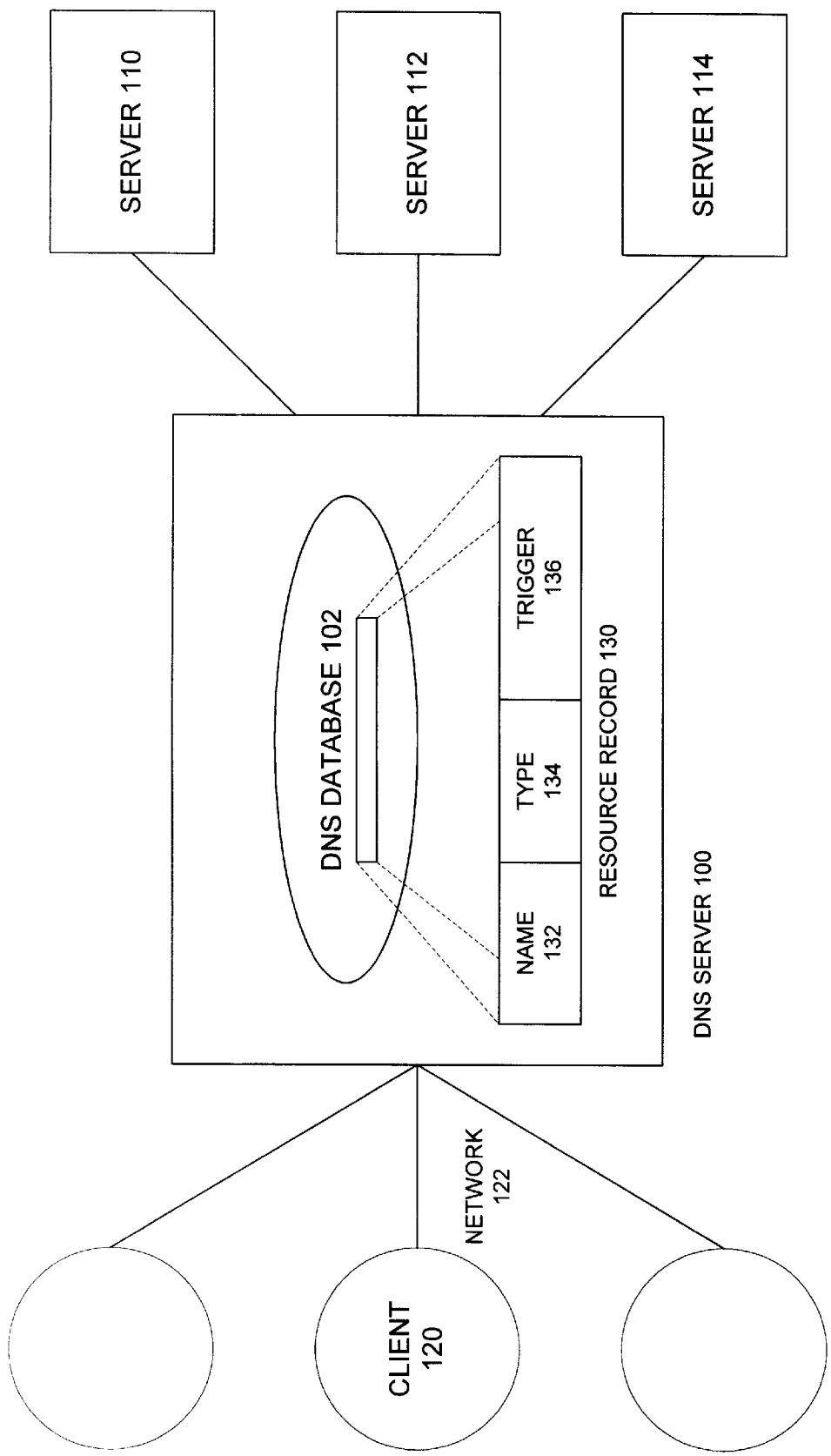
FIG. 1 is a block diagram depicting an illustrative environment in which an embodiment of the present invention may be implemented to load balance client requests among multiple instances of an application.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, exemplary embodiments of the invention are described in the context of a server offering Domain Name Services (DNS) that resolves requests for an application or computer system into an address of a physical machine, such as a network server. One skilled in the art will recognize that the present invention is not limited to the use of DNS and may be readily adapted to other applications and services using a directory lookup, network name service or other method of satisfying network service requests.

The program environment in which a present embodiment of the invention is executed illustratively incorporates a general-purpose computer or a special purpose device such a hand-held computer. Details of such devices (e.g., processor, memory, data storage and display) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. In addition, although specific embodiments of the invention are described using object-oriented software programming concepts, the invention is not so limited and is easily adapted to employ other forms of directing the operation of a computer.

In one embodiment of the invention, a network server is configured in accordance with the Domain Name Service (DNS) to resolve requests for information on or connection to various network entities (e.g., mail routers, web servers, other network servers). Such requests include an identifier of the desired destination entity. The identifier may, for example, comprise a network identity such as a virtual server name or alias. Based on the identifier of the desired entity, the DNS server searches a database of resource records. One or more database records associated with the identifier reference a series of executable instructions (e.g., via a file name).

Such a record, and/or the referenced executable instructions, are herein termed a "trigger" because retrieval and execution of the instructions triggers some action or event. Illustratively, the executable instructions of a trigger are retrieved and executed by the DNS server, although another computer system may do so. The content of a trigger is flexible and is easily modified to have a different effect or to perform a different action.

In one embodiment of the invention, a trigger loads or mounts an alternate name space (e.g., a sub-domain of the network) for handling a client request. In another embodiment of the invention, a trigger determines or retrieves an identity of a network entity to which a client request should be routed. In yet other embodiments, a trigger may cause a message or a query to be returned to a requester, collect information concerning the request and/or requester, etc.

FIG. 1 is a block diagram depicting an illustrative environment in which an embodiment of the invention may be implemented to distribute (e.g., load balance) client requests for an application (e.g., application program or replicated service) operating on multiple host servers. DNS server 100 is a computer system offering DNS services to clients such as client 120. Back-end or host servers 110, 112 and 114 are servers offering instances of the application. Servers 110, 112 and 114 may be dispersed or proximate to one another (e.g., geographically or logically).

DNS server 100 includes DNS database 102 for resolving client requests. DNS database 102, which may be a zone file or lookup table, thus includes one or more resource records associated with the application (e.g., indexed by a virtual server name or alias by which the application is known or by an identity of a servers hosting an instance of the application). In one embodiment of the invention a new type of resource record is provided which, as described above, references a trigger that is executed upon retrieval of the record.

Resource record 130 is an example of one such resource record and is comprised of multiple fields. Illustratively, name field 132 contains the name of a network entity (e.g., an application, service, virtual server name, alias, address) known to DNS server 100. Name field 132 may, for example, contain a name by which the application is known to client 120. Type field 134 illustratively indicates the type of resource record (e.g., to indicate that it contains a trigger). Trigger field 136 contains an identity (e.g., full or relative path, including file name) of the trigger. The trigger identified in trigger field 136 may be located on DNS server 100, although in other embodiments of the invention it can be located on a different computer system. One skilled in the art will appreciate that resource record 130 may contain additional fields, such as a field indicating a length of time that a server is permitted to cache the resource record or the trigger.

Client 120 may be a personal computer or workstation configured to provide a user access to a network (e.g., the Internet) and various applications and services on servers 110, 112 and 114. Client 120 is thus coupled to DNS 100 via network 122, and includes instructions (e.g., a web browser) for communicating via network 122. Client 120 further includes common components such as a processor, memory, storage, input and output devices, etc. Such common components are well known to those skilled in the art and are omitted from FIG. 1 for the purpose of clarity.

Figure 2:
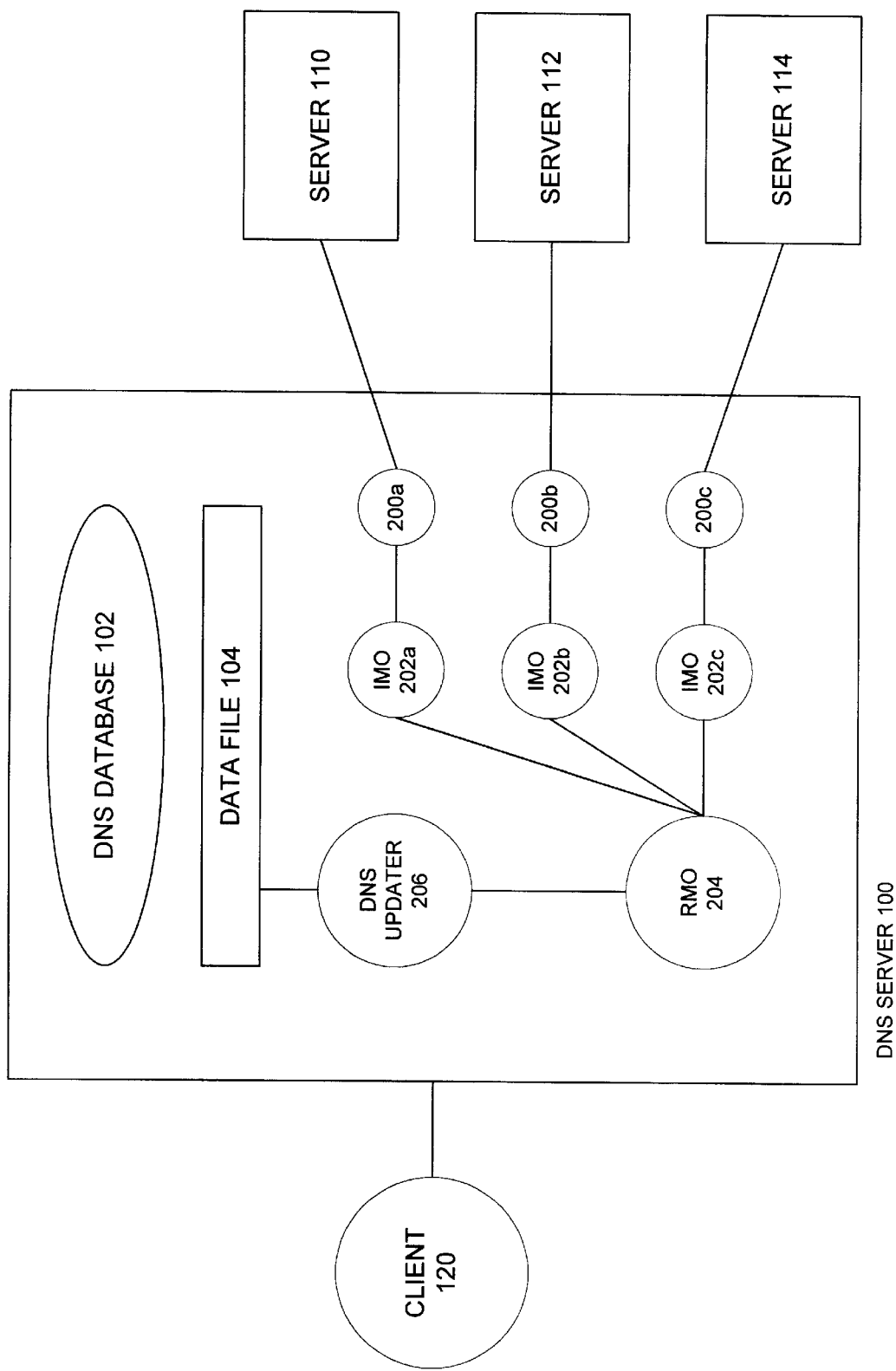
FIG. 2 is a block diagram depicting a method of using a trigger to balance client requests among multiple instances of an application in a non-intrusive manner in accordance with an embodiment of the present invention.

FIG. 2, discussed in detail below, depicts additional details concerning an embodiment of the invention for performing load balancing among multiple instances of an application or multiple servers offering instances of an application.

In this embodiment of the invention, information concerning instances of the application is collected and analyzed, allowing a "preferred" server to be identified based on the collected information. Illustratively, the preferred server is the server that is to receive and handle a client request for the application. A preferred server may be identified on a regular or periodic basis, and may be the same as or different from the one previously identified. By periodically selecting a new preferred server, client requests are distributed among the participating servers and the application is thereby load-balanced.

The information that may be collected concerning an instance of the application illustratively includes its response time for a client request, its operational status (e.g., whether it is up or down), the number of clients connected to the instance, the number of client requests pending with the instance, its throughput (e.g., number of client requests handled in a period of time), etc. Information concerning the status or performance of the servers themselves (e.g., load, capacity, distance from a central server) may also be collected and analyzed as part of the process of choosing a preferred server. Thus, based on the information collected from the servers and application instances, a preferred server could be the closest server to a requester or the DNS server, the least-loaded server or instance of the application, the application instance or server having the best throughput, etc.

Illustratively, the information described above is stored on the DNS server or a system that is coupled to the DNS server. Identities of one or more preferred servers may also be stored. Thus, a trigger, when executed in response to a client request, may retrieve an identity of a pre-selected preferred server or select a preferred server based on the collected information and/or criteria provided in the client request.

The load-balanced application may be exposed (e.g., identified) to requesters through a virtual server name. As explained above, clients wishing to access the application contact the DNS server to identify or determine a server offering the application. One skilled in the art will appreciate that known DNS servers typically satisfy such client requests by resolving the virtual server name to an identity (e.g., a network address) of one network server within a pool of suitable servers.

In accordance with the presently described embodiment of the invention, however, the DNS server retrieves a trigger when it receives a client request for the application. As described above, a new type of resource record within the DNS database identifies the trigger. In one embodiment of the invention the trigger comprises a fully qualified identity (e.g., path name) of a file containing executable instructions. The trigger is retrieved from storage and is executed on the DNS server or another computer system.

As mentioned above, the trigger is illustratively configured to retrieve the end result of the analysis of the information received from the application instances and/or the servers offering the application instances. Thus, the trigger may retrieve the identity of a preferred server based on a default parameter (e.g., the application instance that has the fewest pending client requests) or on one or more policy parameters included in the client request.

In an alternative embodiment of the invention, the trigger is configured to analyze the raw information that was collected and thereby determine a preferred server for the client request. If the DNS server does not have access to the type of information needed to choose a preferred server in accordance with a client's parameters, a default server may be identified, an error message may be returned, the information may be interactively requested from one or more servers, etc. In yet another alternative embodiment, the trigger may be configured to interactively interrogate or query the servers and/or application instances in order to determine a preferred server for receiving the client request. One skilled in the art will appreciate that various details concerning the use of a trigger to load-balance client requests, other than those described herein, may be adopted or altered without exceeding the scope of the invention.

The parameters that a client may submit to the DNS server illustratively correspond to the various types of information that may be collected from the participating servers (an illustrative sampling of which is presented above). Other parameters may be enabled as needed or desired, in which case corresponding information may then need to be collected from the application instances and/or servers.

The type of information that is collected from the application instances and/or host servers may be determined by a load balancing policy selected by a system manager or administrator. The policy may reflect one or more of the parameters that a client might identify to the DNS server.

The various pieces of information that are collected are illustratively assembled on the DNS server, although another storage system accessible to the DNS server may be used. In an alternative embodiment of the invention, instead of collecting a limited amount of information from the application instances and host servers, all information that may be used in load balancing is collected.

In the embodiment of the invention depicted in FIG. 2, series of computer-readable instructions (e.g., objects, agents, modules) are executed on each of the multiple servers offering an instance of the application and/or on the DNS server (or other server). These instructions function to gather, collect or retrieve the information necessary to choose a preferred server. For example, in the case of a database application information such as the number of database accesses, the number of pending client requests, the number of active users, etc. may be gathered. As another example, if the load-balanced application were an electronic mail program, it may report the number of inbound and/or outbound messages in queue, the number and size of mailboxes, the application's capacity, etc.

FIG. 2 thus depicts an illustrative non-intrusive embodiment of the invention in which operational and/or statistical information is collected from servers 110, 112 and 114 (and/or application instances operating on the servers) and analyzed on DNS server 100 using executable objects installed on DNS server 100. Data file 104 (or other data storage means), stores the collected information and/or the results of the analysis of the collected information. Data file 104 may thus store identities of one or more preferred servers for receiving client requests. Where multiple preferred servers are identified, they may reflect different load-balancing policies. Illustratively, data file 104 is located on the same system on which triggers are stored, although this is not required. In one embodiment of the invention, therefore, when a trigger is retrieved and executed in response to a client request, the identity of a preferred server is retrieved or is determined in accordance with the collected information. The selection of a preferred server may also take into account a parameter (e.g., a load-balancing parameter) provided in the client request.

In the illustrated non-intrusive mode of operation, status objects 200*a*, 200*b* and 200*c* are invoked on DNS server 100 for the purpose of gathering information from servers 110, 112 and 114, respectively. The configuration and purpose of the status objects may depend upon the load balancing policy that has been selected for choosing a preferred server. For example, where the selected policy requires choosing the least-loaded server or instance of an application (e.g., that which has the fastest response time), each status object may measure the response time of its associated server or the application instance operating on the server. Or, where the selected policy requires choosing the closest server, the status object may be configured to measure the number of hops from DNS server 100 to the object's associated server. Alternatively, each status object may collect all relevant information (rather than a specific piece of information) from its associated server or application instance.

In one configuration, status objects 200*a*, 200*b* and 200*c* are designed to determine whether their associated application instance or server is operational. Illustratively, the status objects in this embodiment issue a Connect command to the application or a Ping command to the server. If the command is successful the issuing object knows that the target is operational, otherwise it is assumed to be inoperative.

Illustratively, for each application operating on servers 110, 112 and 114 that is to be monitored (i.e., that is subject to load balancing), a separate status object operates on DNS server 100. In addition, each status object illustratively performs a single function (e.g., determine response time, determine a server's distance from DNS server 100). In alternative embodiments of the invention, however, a single status object may monitor multiple servers or applications and/or perform multiple functions.

In FIG. 2, individual monitor objects (IMO) 202*a*, 202*b* and 202*c* also reside and execute on DNS server 100. A separate IMO is depicted for each server or application instance. In particular, IMOs 202*a*, 202*b* and 202*c* invoke and collect information from status objects 200a, 200b and 200c, respectively. Individual monitor objects may also be known as server monitor objects.

In the presently described embodiment, different types of status objects are invoked with differing degrees of regularity. When the active status objects collect the response times of application instances or servers, for example, IMO 202a may invoke status object 200a relatively frequently (e.g., every sixty seconds). In contrast, when the active status objects reflect a policy preferring the closest server, IMO 202b may invoke status object 200b only occasionally (e.g., once per day) because the distance from DNS server 100 to server 112 is unlikely to change very often.

Although each IMO is associated with only one status object in the illustrated embodiment, in an alternative embodiment of the invention an IMO may invoke and collect data from multiple status objects. In this alternative embodiment, for example, an IMO may invoke one status object to determine the response time of a server or application instance and another status object to determine whether the server or application instance is operational.

Replicated monitor object (RMO) 204 retrieves the information from each IMO associated with an application. Therefore, in the illustrated embodiment where each of servers 110, 112 and 114 operate a separate instance of the application, RMO 204 collects data from IMOs 202a, 202b and 202c. Illustratively, if the servers also offered another application, a second RMO would operate on DNS server 100 for the purpose of retrieving information concerning that application from a different set of IMOs. A replicated monitor object may also be known as a central monitor object due to its coordination role on behalf of a central server (e.g., DNS server 100).

Thus, for each application for which load balancing is performed in accordance with the illustrated embodiment of the invention, a status object collects load and/or operational information from each server executing an instance of the application. In addition, an IMO exists for each application instance and an RMO operates for each application.

In one embodiment of the invention, the data collected by RMO 204 from the various IMOs is then analyzed, illustratively by DNS updater 206, in accordance with the selected load balancing policy and a preferred server is identified. As discussed above, a preferred server may, for example, be the one having the application instance with the fastest response time (and which is thus likely to be the least-loaded) or the server closest to DNS server 100. Illustratively, RMO 204 maintains a data structure (e.g., array, vector, table, database) identifying each server and/or instance of the application that is being load-balanced, along with one or more values or other indicators or summaries of the collected information concerning each instance of the application. Alternatively, multiple preferred servers may be selected for different load balancing policies, in order to allow rapid satisfaction of client requests specifying different criteria.

Finally, in the illustrated embodiment DNS updater object 206 updates data file 104 after the collected information is analyzed and a preferred server is selected. Again, the data stored in data file 104 may comprise the information collected from the application instances (and/or host servers) and/or identities of one or more preferred servers. In this embodiment, RMO 204 retrieves the collected data and DNS updater 206 updates the data file on a periodic basis. Illustratively, if the selected policy specifies the use of the closest server, RMO 204 and DNS updater 206 need not take action as often as they do when the policy requires the use of the application instance with the fastest response.

Figure 3:
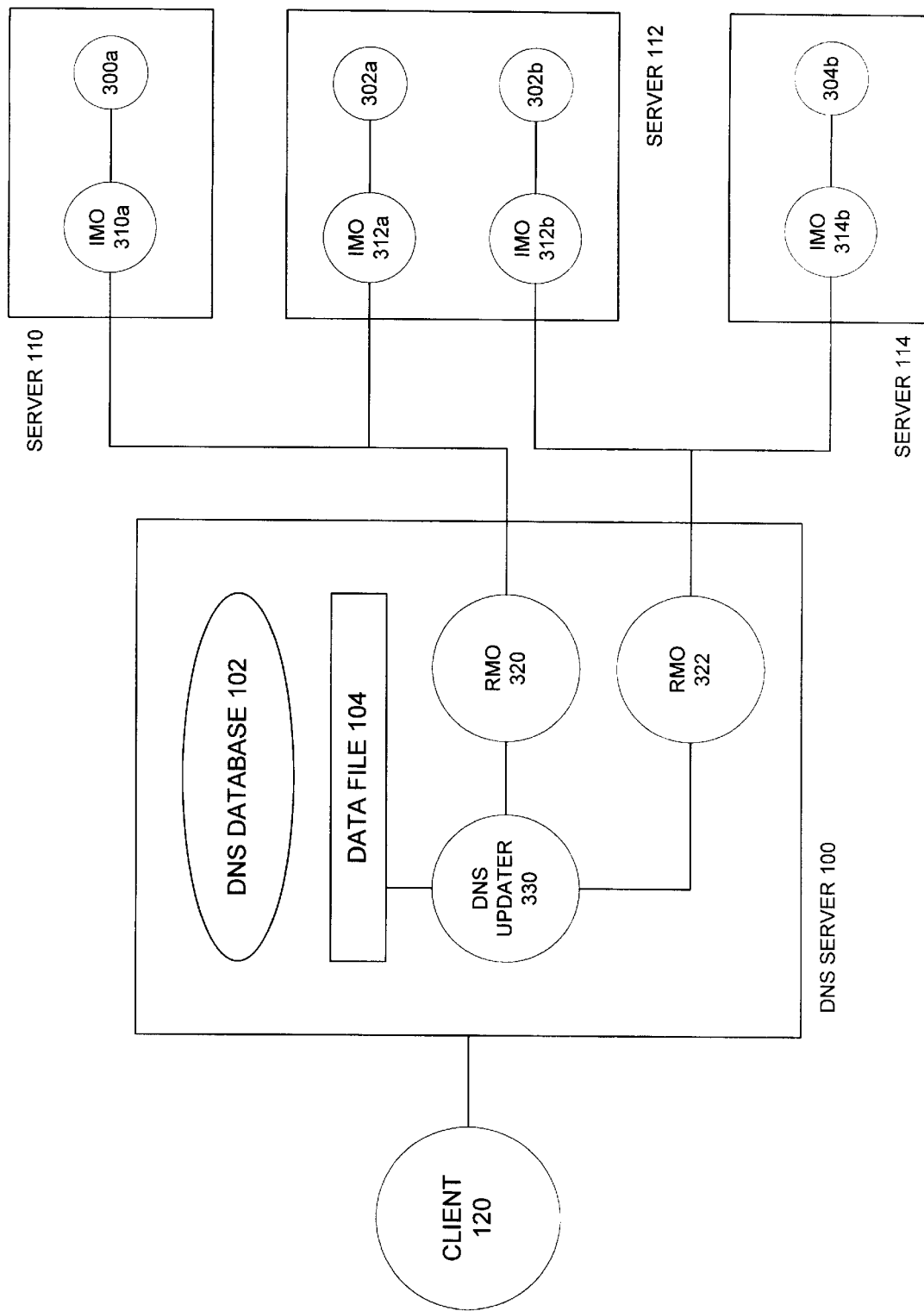
FIG. 3 is a block diagram depicting a method of using a trigger to balance client requests among multiple instances of an application in an intrusive manner in accordance with an embodiment of the present invention.

FIG. 3 depicts an illustrative embodiment of the invention employing an intrusive mode of operation. In this mode of operation, status objects and individual monitor objects reside and execute on the servers operating instances of the load-balanced application.

In FIG. 3, two load-balanced applications are offered among servers 110, 112 and 114. Thus, status objects 300a and 302a collect load and/or operational data concerning a first application (e.g., web browsing), while status objects 302b and 304b collect load and/or operational data concerning a second application (e.g., electronic mail).

Each server also operates an IMO for each load-balanced application for the purpose of receiving data from its associated status object(s). For example, FIG. 3 depicts IMO 312a coupled to status object 302a and IMO 312b coupled to status object 302b on server 112. Thus, in the embodiment of the invention depicted in FIG. 3, status objects and IMOs reside on individual servers that are being load-balanced, but perform substantially the same functions as in the embodiment depicted in FIG. 2.

Replicated monitor object 320 interfaces with IMOs 310a and 312a and RMO 322 interfaces with IMOs 312b and 314b to retrieve the necessary information concerning the applications. Various means of communication may be employed between the RMOs and IMOs. In a present embodiment of the invention Object Request Broker (ORB) technology is employed. In an alternative embodiment of the invention Remote Procedure Call (RPC) technology may be used.

DNS updater 330 also resides on DNS server 100 in the presently described embodiment and operates in substantially the same manner as described above. After the data concerning each instance of each application is retrieved (and, possibly, analyzed), in the present embodiment of the invention DNS updater 330 updates data file 104 with the collected information and one or more preferred server identities for each application. Illustratively, one DNS updater is used to update the data file for all applications being load-balanced. However, in an alternative embodiment of the invention separate DNS updaters can be employed for each application.

Figure 4:
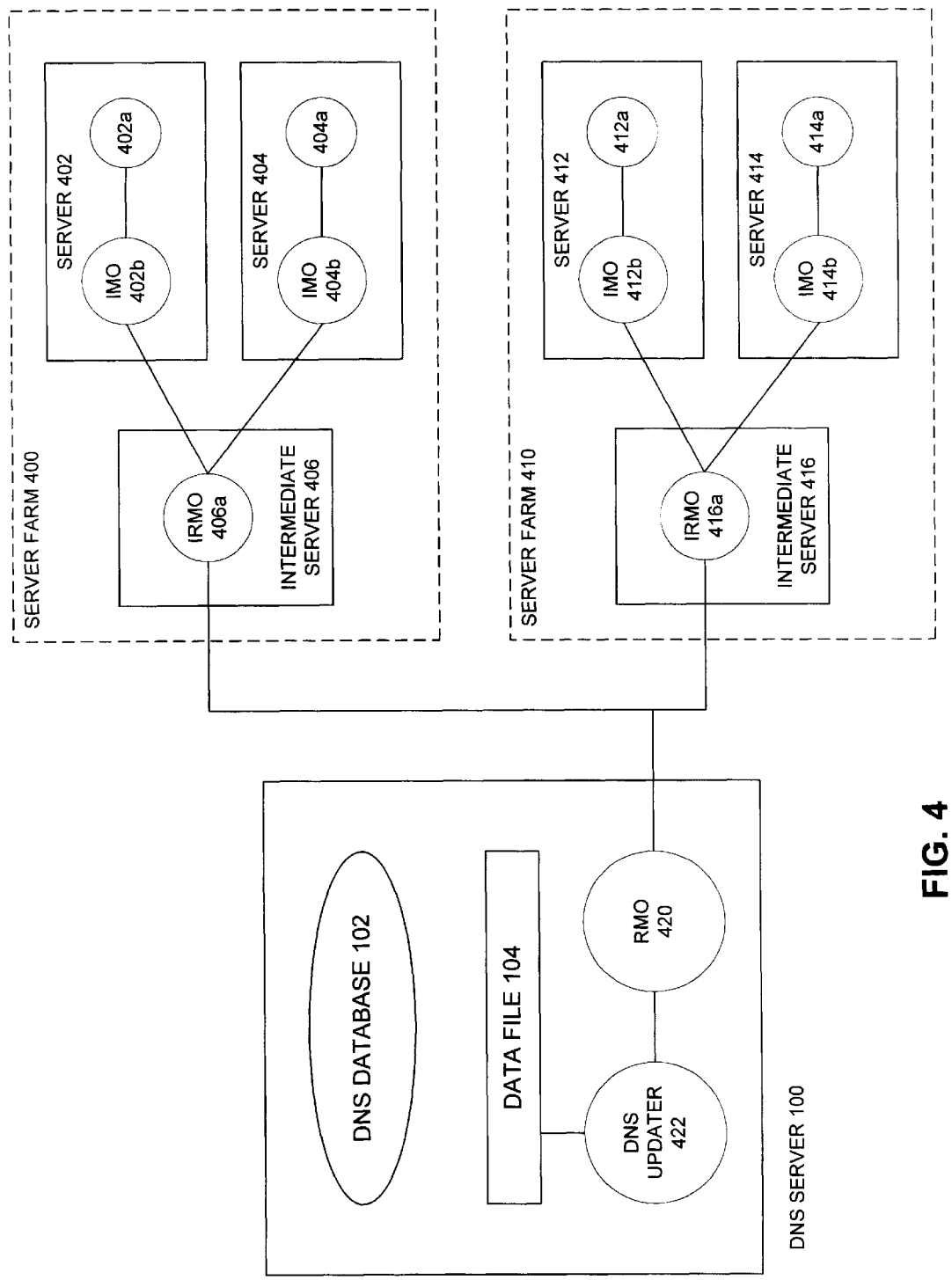
FIG. 4 is a block diagram depicting a method of using a trigger to balance client requests among geographically dispersed servers in accordance with an embodiment of the present invention.

FIG. 4 depicts an alternative embodiment of the invention in which servers offering a load-balanced application are geographically dispersed. In FIG. 4, server farm 400 represents a first collection of servers offering the application and server farm 410 represents a second collection of servers offering the same application. Although server farms are depicted with multiple servers (i.e., servers 402 and 404 in server farm 400 and servers 412 and 414 in server farm 410), a server farm may consist of any number of servers, even one.

Each server farm in the illustrated embodiment also includes an intermediate server (i.e., server 406 in server farm 400 and server 416 in server farm 410). One function of an intermediate server in this embodiment is to collect, from the servers in the farm that offer the application, the information to be used to select a preferred server. For example, intermediate replicated monitor object (IRMO) 406a is operated on intermediate server 406 to collect data from servers 402 and 404. IRMO 406a thus operates similarly to the RMOs described above, but is illustratively located on a server situated between DNS server 100 and the servers offering the application. As described in conjunction with FIG. 3, status objects (e.g., depicted by numerals 402a, 404a, 412a and 414a) and IMOs (e.g., depicted by numerals 402b, 404b, 412b and 414b) operate on servers 402, 404, 412 and 414.

RMO 420 operates on DNS server 100 to collect data from the IRMOs within each server farm (e.g., IRMO 406 and 416). DNS updater 422 updates data file 104 to reflect the collected data and, possibly, one or more preferred servers identified from the data.

In an alternative embodiment of the invention in which an application is offered on multiple servers, one or more of which are local and one or more of which are remote, aspects of the embodiments of the invention depicted in FIGS. 3 and 4 are combined. In this alternative embodiment, intermediate servers with IRMOs are employed in server farms comprising the remote servers to pass data between the remote servers' IMOs and an RMO, as in the embodiment depicted in FIG. 4. Local servers, however, employ IMOs that communicate with the RMO without an intervening RMO, as in FIG. 3.

In another alternative embodiment of the invention, load balancing for an application is performed among multiple participating servers wherein one or more of the servers are segregated (e.g., situated in a remote location and/or within a server farm). Within the group of segregated servers, a "local" load balancing policy may be implemented for distributing among the servers all client requests sent to the group (or to any member of the group). In this alternative embodiment, the segregated servers may be considered a single entity for the purposes of a "global" load balancing policy specifying the manner in which all client requests for the application are to be distributed among all participating servers. The global and local policies need not be equivalent (e.g., the global policy may require selection of the closest server (or group of servers) while the local policy may require the least-loaded server or application instance.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

In one alternative embodiment of the invention, for example, clients access an instance of the application program directly (i.e., rather than connecting through a central server). In this alternative embodiment, the program instances (via status objects and/or other elements of the load balancing framework) exchange information and redirect client requests as necessary to balance the requests in accordance with the selected policy.

What is claimed is:

1. A method of handling a resource request, comprising:
   receiving a resource request at a network server from a client computer system, said resource request including a first identity of a network entity;
   searching a database for a resource record associated with said network entity;
   retrieving an identifier of a series of executable instructions from said resource record; and
   executing said series of instructions to facilitate providing the requested resource to said client by said network entity.

2. The method of claim 1, wherein said network entity is an application.

3. The method of claim 1, wherein said network entity is a server operating an application.

4. The method of claim 1, wherein said network server is a DNS server and said receiving a resource request comprises receiving a request concerning access to said network entity.

5. The method of claim 4, further comprising identifying a means for accessing said network entity.

6. The method of claim 5, wherein said means comprises an address.

7. The method of claim 5, wherein said identifying comprises retrieving a second identity of said network entity.

8. The method of claim 7, wherein said first identity comprises a name and said second identity comprises an address.

9. The method of claim 5, wherein said identifying comprises:
   analyzing information concerning a set of network entities; and
   selecting said network entity on the basis of an operational characteristic.

10. The method of claim 9, wherein said resource request includes said operational characteristic.

11. A method of load-balancing requests for an application received at a central server among a set of servers, wherein each server in the set of servers operates an instance of the application, comprising:
   receiving a client request concerning access to the application;
   retrieving a resource record associated with the application, said resource record referencing a trigger, wherein said trigger comprises a series of executable instructions;
   executing said trigger to determine an identity of a preferred server from the set of servers, said preferred server operating an instance of the application to be accessed by said client;
   identifying a first factor for selecting said preferred server, said first factor comprising an operational characteristic of the application;
   receiving a first status of said first factor for a first instance of the application operating on a first server; and
   receiving a second status of said first factor for a second instance of the application operating on a second server.

12. The method of claim 11, further comprising:
   examining said first status and said second status to select a preferred server; and
   storing an identity of said preferred server.

13. The method of claim 11, further comprising:
   executing a first status object to determine a first status of said first factor for a first instance of the application, wherein said first status object resides on a first server; and
   executing a second status object to determine a second status of said first factor for a second instance of the application, wherein said second status object resides on a second server.

14. The method of claim 11, wherein said receiving a first status comprises collecting data concerning a first instance of the application.

15. The method of claim 13, further comprising:
   receiving said first status by a first server monitor object; and
   receiving said first status at the central server from said first server monitor object.

16. The method of claim 11, wherein said executing said trigger to determine an identity of a preferred server comprises retrieving a stored identity of a preferred server.

17. The method of claim 11, wherein said executing a trigger to determine an identity of a preferred server comprises examining said first status and said second status to select a preferred server.

18. A method of handling a client request at a central server, comprising:
   receiving a client request, said request comprising an identifier of an application;
   retrieving a resource record associated with said application, said resource record comprising a trigger; and
   executing said trigger;
   wherein said trigger comprises a series of executable instructions.

19. The method of claim 18, wherein the server is a DNS server, further comprising searching a DNS database for a resource record associated with said application.

20. The method of claim 19, wherein:
   said receiving a client request comprises receiving a request for an identifier of a server offering an application; and
   wherein said trigger comprises a series of instructions for determining an identifier of a server offering an application.

21. An apparatus for balancing requests for an application among multiple servers operating multiple instances of the application, wherein the requests are received at a central server, comprising:
   a trigger for executing a series of instructions in response to a request for the application from a client computer system;
   a first server for operating a first instance of the application;
   a second server for operating a second instance of the application;
   a first status module for determining a first status of said first instance;
   a second status module for determining a second status of said second instance;
   an analysis module for examining said first status and said second status and selecting one of said first server and said second server for receiving said request for the application.

22. The apparatus of claim 21, wherein said trigger comprises an identifier of said series of instructions and said series of instructions comprises said analysis module.

23. The apparatus of claim 21, wherein said first status module resides on said first server.

24. A computer readable storage medium storing instructions that, when executed by a computer, cause the computer to perform a method for handling a resource request, the method comprising:
   receiving a resource request at a network server from a client computer system, said resource request including a first identity of a network entity;
   searching a database for a resource record associated with said network entity;
   retrieving an identifier of a series of executable instructions from said resource record; and
   executing said series of instructions in response to said resource request.

25. A computer readable storage medium containing a data structure for storing a trigger, said data structure comprising:
   an index portion for storing an identifier of a network entity;
   an identifier of a trigger, said trigger comprising a series of executable instructions; and
   a type portion for identifying the data structure as comprising said trigger;
   wherein said data structure is retrieved and said trigger executed in response to a client request for a resource offered by said network entity.

26. The method of claim 9, wherein said operational characteristic is one of: a response time of said network entity, a load on said network entity, a distance to said network entity and a throughput of said network entity.

27. The method of claim 1, wherein said requested resource is available on said network entity but is not available on said network server.

* * * * *

UNITED STATES PATENT AND TRADEMARK OFFICE
CERTIFICATE OF CORRECTION

PATENT NO : 6,092,178
DATED : 07/18/00
INVENTOR(S): Jindal, et al.

It is certified that an error appears in the above-identified patent and that said Letters Patent are hereby corrected as shown below:

In column 1, line 8, replace "Enviroiment" with --Environment--.

Signed and Sealed this

Third Day of April, 2001

*Attest:*

NICHOLAS P. GODICI

*Attesting Officer*      *Acting Director of the United States Patent and Trademark Office*